United States Patent

[11] 3,603,271

| [72] | Inventors | Franz Remensperger<br>Saint Georgen;<br>Walter Schnee, Villigen, both of, Germany |
|---|---|---|
| [21] | Appl. No. | 795,091 |
| [22] | Filed | Jan. 29, 1969 |
| [45] | Patented | Sept. 7, 1971 |
| [73] | Assignee | Fr. Windler KG, Spezialfabrik Fur<br>Backereimaschinen Und Backofen<br>Villigen/Schwarzwald, Germany |
| [32] | Priority | Feb. 9, 1968 |
| [33] | | Germany |
| [31] | | P 16 32 356.1 |

[54] EQUIPMENT FOR TRANSFERRING PIECES OF DOUGH
19 Claims, 6 Drawing Figs.

[52] U.S. Cl. ................................................. 107/57 A,
198/20
[51] Int. Cl. ..................................................... A21c 9/08,
B65g 47/52
[50] Field of Search ........................................... 107/57 A,
57 D, 57 R, 56; 198/20

[56] References Cited
UNITED STATES PATENTS

| 891,816 | 6/1908 | Copland ..................... | 107/57 A |
| 1,359,247 | 11/1920 | Haller ......................... | 107/57 A |
| 3,395,653 | 8/1968 | Messerly et al. ............. | 107/57 A |

*Primary Examiner*—Price C. Faw, Jr.
*Attorney*—Howson and Howson

ABSTRACT: Equipment for transferring pieces of dough brought up on cooking, baking or the like underlays, to a doughpieces carrier by means of a circulating transferring conveyor belt, which projects at both sides in the form of belt tongues and which is disposed in a stationary frame, characterized in that the transferring conveyor belt is disposed on a slide which is able to move to or fro in the direction or counter to the direction of circulation of the conveyor belt, and characterized in that the direction in which the conveyor belt, and characterized in that the direction in which the conveyor belt circulates and direction in which the slide moves are reversible in such a way that the same mechanism can be used both for loading and also for unloading baked goods carriers.

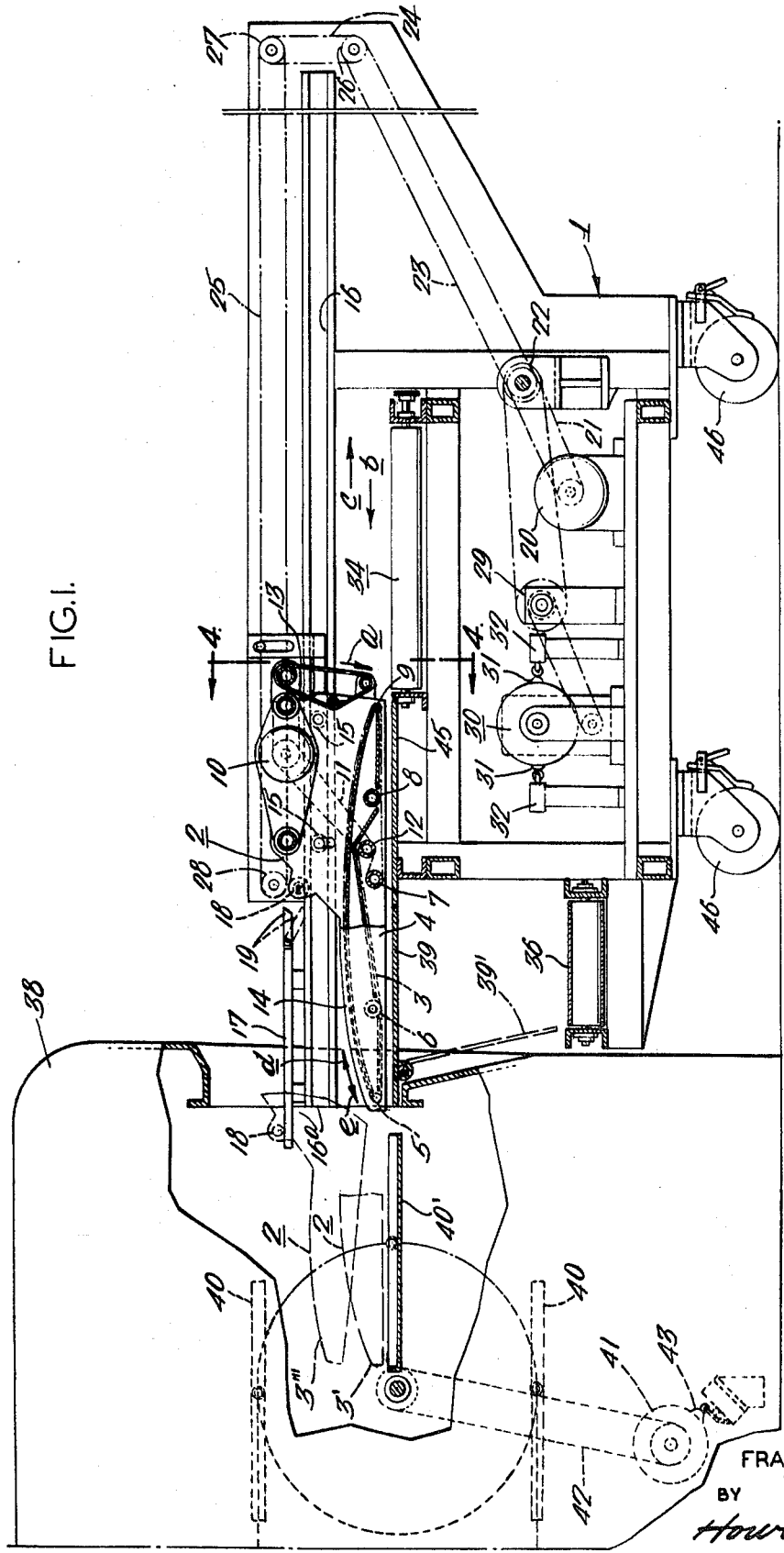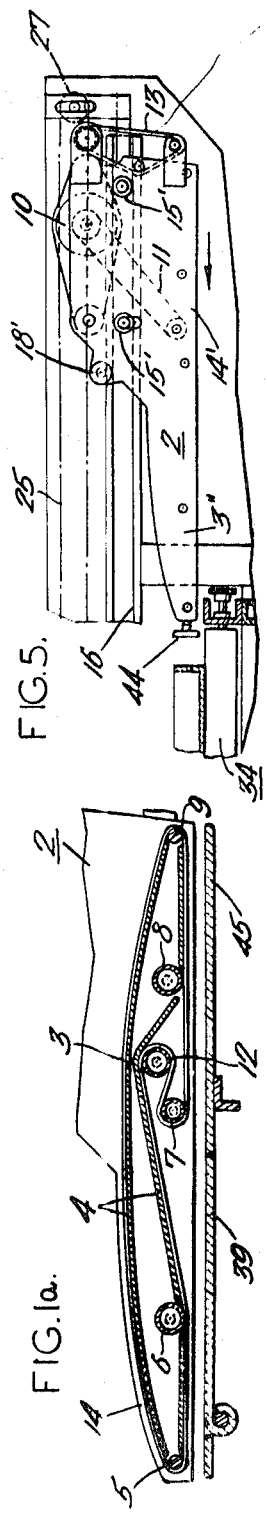
INVENTORS:
FRANZ REMENSPERGER
WALTER SCHNEE
BY Howson & Howson
ATTYS.

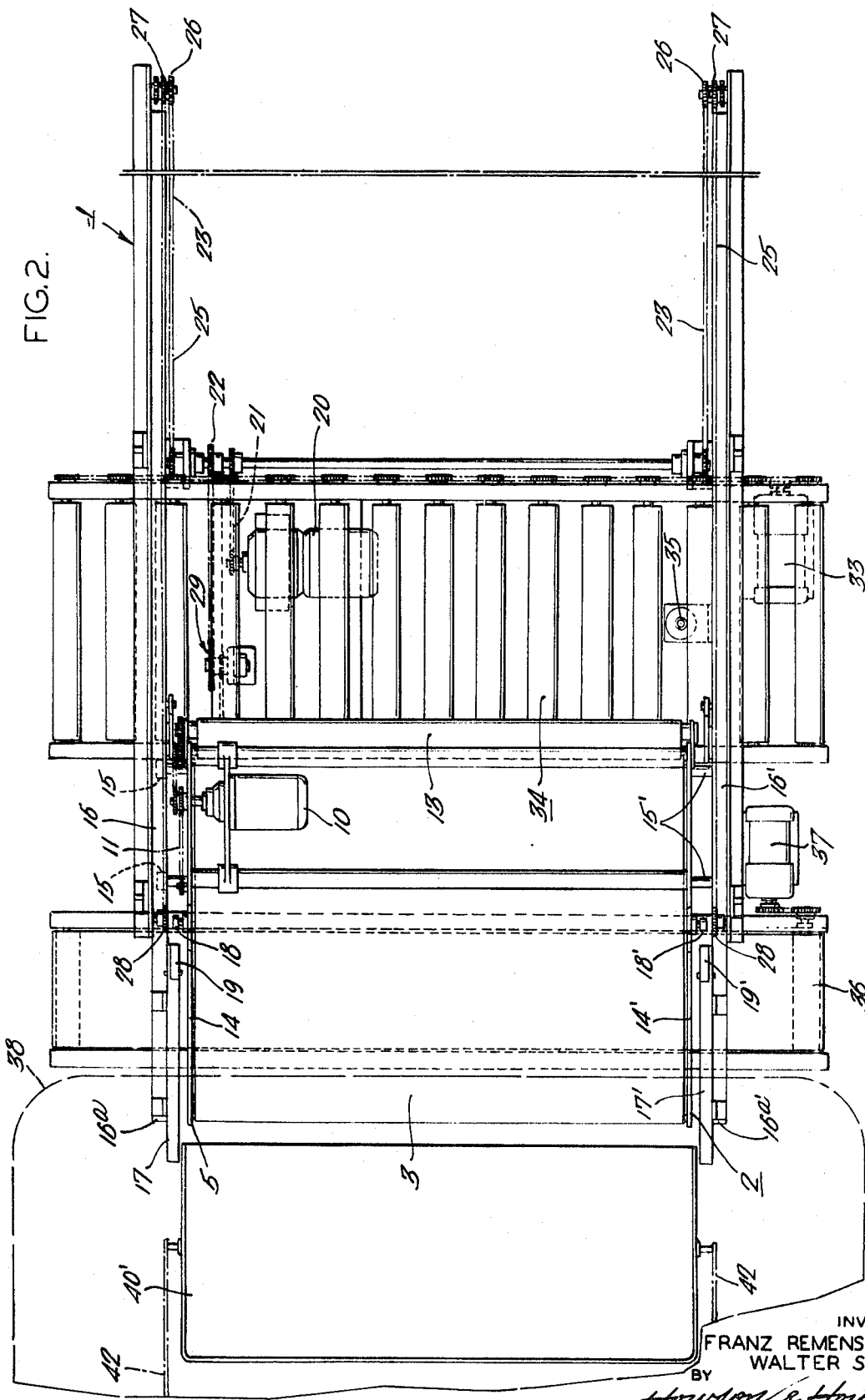

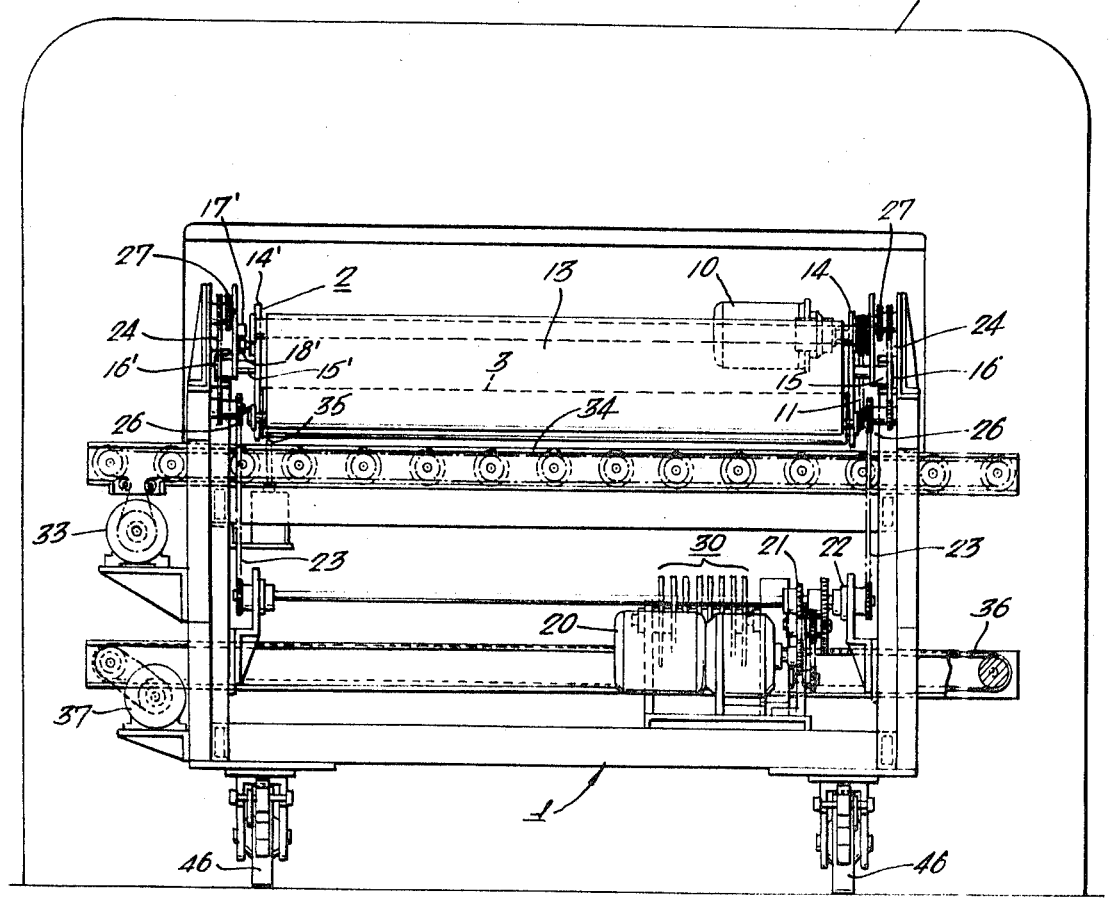
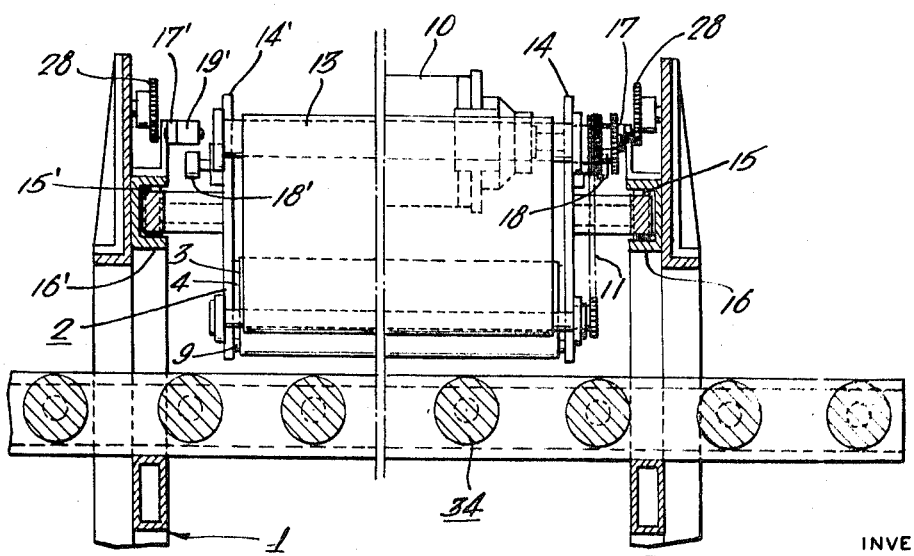

EQUIPMENT FOR TRANSFERRING PIECES OF DOUGH

The invention concerns equipment for transferring pieces of dough, brought up on cooking, baking or the like supports, to a carrier for pieces of dough.

There has already been proposed a transferring equipment which takes off a moving conveying means the brought-up workpieces, by means of a circulating conveyor belt, projecting at both sides in the form of belt tongues, and lays them on a following and likewise moving conveyor belt.

With this arrangement the workpieces are transferred to the belt tongues serving to receive them, and are then suitably transported farther after being deposited, because the transferring mechanism itself does not move from its location. This arrangement thus does not permit unloading or loading carriers of pieces of dough that do not move.

There has already been proposed a depositing device with which the setting-down tongues move to and Fro opposite the following support or carrier of the pieces of dough. Not taking into consideration that in this case the means for actuating the conveying belt are relatively expensive because of the movement of the belt tongues relatively to the depositing device, when this arrangement is used the following carriers of the doughpieces must also be moved in the direction of transportation.

The present invention has the fundamental problem of creating a depositing mechanism which is utilizable as universally as possible, with which workpieces on any desired stationary underlays, cooking sheets for example, can be lifted up and be deposited with controlled action upon stationary underlays, for example preferably baking carriers. Above all this equipment should be suitable both for loading a following carrier of doughpieces, preferably the baking underlay of an oven, and also be suited for example, at the end of the baking operation, for unloading the baking underlays or the like.

In accordance with the present invention, for the solution of this problem there is proposed an arrangement of the kind explained at the outset, with which the circulating transferring belt is disposed in a slide, which can move in or contrary to the direction of circulation of the conveyor belt. Because, in accordance with a further characteristic of the invention, both the direction of circulation of the conveyor belt and also the direction of movement of the slide can be reversed, it is possible with the same mechanism, and depending on the direction in which the conveyor belt circulates and the direction in which the slide moves, to remove pieces of dough from one carrier, deposit them on a following carrier, and finally, after suitably reversing the directions of movement, to lift them off the said carriers.

Hereby the following plan must be conformed to. Both during the lifting-off and also during the depositing of doughpieces the upper length of the conveyor belt must move counter to the direction in which the slide advances. When the currently operative belt tongue runs from front to back over the doughpieces carrier, the doughpieces are lifted up; and in the contrary case they are on the other hand deposited. Of course the doughpieces, for example already baked goods such as rolls or the like, even with the slide stationary can be deposited solely through moving the transferring conveyor belt.

In the lifting of the workpieces off their support is is often quite necessary that these pieces shall during the intermediate transportation not change their relative positions. For the purpose of obtaining perfect transfer, in which the positions of the workpieces remain unchanged, an auxiliary transferring belt, disposed above the belt tongues, is proposed.

The said transferring belt holds the doughpieces from above with a light pressure and conducts them to the conveyor belt with their positions unchanged.

During the depositing the depositing tongue is drawn away from back to front closely above the baking underlay. Because of the short distance the doughpieces drop, they are transferred correctly as to position. If they should become turned during the transfer, the height of drop should be increased. In order to obtain this with the mechanism of the invention, the depositing tongues of the transferring belt can be raised relatively to the following underlay, that is the baked goods carrier as a rule. With the example of construction of the invention, for this purpose the slide together with the conveyor belt is pivoted relatively to the frame. This relatively small pivoting can for example be done for example by means of one or more guiderails set at a higher plane, upon which the guidepins of the slide run after operation of a switch.

For unloading the baked goods that are lifted up again by the mechanism of the invention there can be disposed below the depositing tongues of the transferring conveyor belt a chute, which can preferably be folded down, and also a transport belt or a similar conveying means moving transversely to the direction of the conveyor belt.

In a similar way, the doughpieces can be brought up to the transfer mechanism by means of supplying belt, rollers-track or the like, ending at the takeoff place.

For automatically controlling the intermediate transfer mechanism and/or the supplying mechanism, in accordance with a further characteristic of the invention there can be provided in the path of the rollers-track or supplying belt a controllable stop or the like. Instead of this it is also possible to make use of an electric or electronic means cooperating with a light-barrier.

In accordance with a further form of construction the mechanism of the invention is even suitable for transferring doughpieces provided with carriers, dough sheets for example, when the slide drive is designed so that the slide with the conveyor belt can be brought back to behind the transfer place. For the transfer of the doughpieces there is disposed, in front of the front end of the conveyor belt, a stop rail extending transversely of the conveyor belt, and by means of which the carriers, brought to the transfer place, are pushed into the oven over guidesheets or guiderails. In this case the aforesaid chute is advantageously made so that it can be brought into the plane of the guidesheets or guiderails.

For the purpose of making it possible to adapt the transferring mechanism of the invention to differing conditions, it is advantageous for the slide and the transferring belt to be individually controllable, and associated with the drive which is reversible as to direction, preferably electromotors.

In accordance with a very simple constructional solution the drive motor of the transferring conveyor belt is disposed on the slide itself, and it drives, preferably through the intermediary of a chain-drive, a roller round which the conveyor belt wraps.

On the other hand the drive motor for the slide is disposed in the frame, and acts on the slide, guided in rails, likewise through the intermediary of a chain-drive.

For properly matching the movements of the slide and of the conveyor belt, a control arrangement is needed. With the example of construction of the invention it consists of a cam that is driven, from the motor that serves to drive the slide through the intermediary of a nonslip drive connection, preferably a chain-drive, the cam lobes actuating switches or the like disposed in the electrical circuit of the drive motor.

For the purpose of the arrangement of the invention making possible an automatic charging of the following doughpieces supporter, in particular the baked goods carrier, there is furthermore provided an automatic control device that can be put into operation by this doughpieces carrier, and that switches on the drive motors of the conveyor belt and of the slide respectively.

Thus for example for a baked goods carrier that is moved step by step, such as is for example used with a tilting oven, certain control devices consist of a cam driven by the baked goods carrier, and whose cam-lobes act on a switch serving to produce the controlling impulses.

A control mechanism actuated by a continuously moved baked goods carrier, for example by the network belt of run-through ovens, can in accordance with a further proposal of the invention consist of a light-barrier or the like that senses the baking surface, and which cooperates with a metering or controlling contrivance for producing the control pulses.

On account of the multitudinous possibilities, it is desirable to make the transferring mechanism of the invention transportable. For this purpose the frame is advantageously provided with rollers, for moving it, that can be locked.

These and other projects of the present invention and the various features and details of the operation and construction thereof are hereinafter more fully set forth in accordance with the accompanying drawings, wherein;

FIG. 1 is a side elevational view partly in section of a transfer mechanism in accordance with the present invention;

FIG. 1a is an enlarged fragmentary sectional view of the slide assembly;

FIG. 2 is an enlarged top plan view of the transfer mechanism;

FIG. 3 is an end elevational view of the transfer mechanism of the present invention;

FIG. 4 is an enlarged sectional view taken on lines 4—4 of FIG. 1; and

FIG. 5 is a fragmentary view of the slide assembly in a retracted position.

Referring now to the drawings and particularly to FIG. 1 thereof, there is illustrated a transfer mechanism constructed in accordance with the present invention. The transfer mechanism comprises a main frame 1 which, in the present instance, is mounted on roller wheels 46 so that it may be moved readily from one location to another and a slide assembly 2 adapted for reciprocating back and forth movement in the direction of the arrows b, c for a purpose to be explained in more detail hereafter.

The slide assembly 2 as best illustrated in FIGS. 2 and 4 includes a pair of spaced-apart side shield members 14 and 14' which mount therebetween a plurality of rollers 5, 6, 7, 8 and 9 adapted to guide and drive a conveyor belt 3 relative to a concave guide sheet 4 extending transversely between the side shield members 14 and 14'. The conveyor belt 3 as illustrated is moved in an endless path by means of a drive roller 12 which is driven for example by an electromotor 10 in the present instance mounted in the slide assembly through a transmission, in the present instance, in the form of a chain 11. The slide assembly 2 further includes a transfer belt 13 mounted adjacent the rear portion of the slide which is suitably mounted on rollers for movement in an endless path in the direction of the arrow a and which cooperates with the conveyor belt 3 to pick up workpieces for example, doughpieces and deposit them on the conveyor belt 3. As illustrated in FIG. 1, the slide assembly 2 is mounted for reciprocating back and forth movement in a pair of spaced-apart guide rails 16, 16' which comprise part of the main frame. The actuating means for the slide assembly 2 includes an electromotor 20 mounted on the base of the main frame 1 operatively connected to the slide assembly through a transmission system including a chain 21, an intermediate drive 22 and chains 23, 24 and 25. The chains 23, 24 and 25 are drivingly connected to the slide assembly through sprocket wheels 26, 27 and 28. The drive system for the slide assembly 2 includes an additional intermediate transmission 29 and a cam disc 30 which is provided with a number of switching cam lobes which are adapted to engage switches 32 controlling movements of the slide assembly and the conveyor belt 3.

As illustrated in FIG. 1, the transfer mechanism further includes a pair of additional guide rails 17, 17', the height of which is selectively adjustable relative to the fixed guide rail 16, 16'. The side shields 14, 14' of the slide assembly mount control pins 18, 18' which are adapted to ride on the rails 17, 17' in response to actuation of the switch 19 so that the slide assembly may be actuated to the position illustrated by dotted lines. By this arrangement the belt conveyor of the slide assembly may be disposed in an elevated position relative to the swings 40 of the bake oven so that doughpieces being discharged from the conveyor may be turned while being deposited and thereby they come to rest with their turned downward top surface on the swing 40'.

The transfer mechanism further includes a transfer conveyor 34 wherein baked goods carriers are delivered to the point of transfer to the slide assembly. Movement of the carriers is limited on the conveyor by means of pins 35 disposed in the path of the roller track which can be withdrawn after the baked goods carriers are empty. Baked goods withdrawn from the oven may be delivered to another location by means of a conveyor belt 36 with its own drive 37 and to this end there is provided a pivotally mounted tube 39' which guides the baked goods to the conveyor 36 when the slide assembly is retracted to a position overlying the conveyor.

Considering now briefly the operation of the transfer mechanism, there is illustrated in FIG. 1 an oven 38 conventionally known as "swing oven." This type of oven includes swings 40 for supporting the baked goods and conveying them through the bake space by means of a drive system [not shown.] Further the swings 40 are held for a predetermined time interval at the position 40' for loading and unloading baked goods onto the swings. The transfer apparatus of the present invention is controlled from the drive of the swing oven 38 by means of a cam 41 which through the intermediary of a chain drive 42 rotates with the movement of the swings 40. The cam 41 is designed so that its lobe 43 which acts on a switch makes a rotation each time a swing 40 arrives from the position 40 to the position 40'.

During this process the slide 2 in the first place is pushed forward out of the illustrated position in the direction of the arrow b, whereby the conveyor belt circulates in the direction of the arrow d. The front belt tongue of the conveyor belt 3 hereby takes the finished baked goods off the baked goods carrier 40', so that in the end the entire load of a swing is set on the conveyor belt. From its dotted-lines position 3' the slide 2 is pulled back from the conveyor belt, which is at first stationary, until the front end of the band tongue arrives approximately in the region of the swung-down chute 39'. The conveyor belt now circulates in the direction of the arrow 3, and the baked goods resting on the conveyor belt are sent over the chute 39', to the transverse belt 36, which carries the finished baked goods away laterally.

At the same time, or following this, the slide is pulled farther back, so that the rear band tongue runs over the charged doughpieces carriers situated on the rollers track 34 and, together with the transfer belt 13, lifts in correct position the workpieces coming out of the fermentation box.

When all the workpieces are situated on the conveyor belt 3, and foremost row of workpieces has reached the front end of the left band tongue, the belt drive 10 is interrupted, and the slide 2 moves in the direction of the arrow b until it reaches the position 3'. For taking off the doughpieces situated on the conveyor belt, the slide 2 is now pushed back in the direction of the arrow c, whereby the conveyor belt 3 circulates in the direction of the arrow e. During this withdrawing process the workpieces are brought into correct position on the baked goods carrier 40'.

In the event that the workpieces should be turned when they are deposited, the conveyor belt is by means of the deviating rails 17, 17' and the switch 19 brought into the position 3'''.

Because the switching times of the control devices, and thus the progress of the movement of the slide and of the conveyor belt can be altered greatly, the mechanism is universally applicable.

It is even suitable for the transfer of baking sheets charged with doughpieces. In that case the slide with the conveyor belt is pulled back to the position 3' as shown in FIG. 5. With the stop-rail 44 disposed at the front end of the band tongue, baking sheets, brought up on the rollers track 34, can be pushed into the oven over the guidesheet 45, with the chute 49 swung into its upper position.

As is also shown by the drawing, the arrangement of the invention is provided with rollers 46 for moving it, and these rollers can be arrested by sliding-contact brakes, so that the loading and unloading mechanisms can be put to use as desired at different places of an operation.

I claim:

1. Equipment for transferring pieces of dough conveyed to a doughpieces carrier by means of a circulating transferring conveyor belt of a configuration to define a pair of belt tongue ends comprising a main frame, said transferring conveyor belt disposed in said frame, a slide member mounting said transfer conveyor and adapted for reciprocating back and forth movement relative to said main frame, the direction of circulation of the conveyor belt and the direction of movement of said slide being reversible in such a way that the same mechanism can be used for loading and unloading baked goods carriers.

2. Equipment in accordance with claim 1 characterized in that both in the picking up and also in the laying down of doughpieces the upper length of the transferring conveyor belt moves contrary to the direction of the pushing forward of the slide, whereby the belt tongue currently operative in taking over the doughpieces moves over the doughpieces carrier from front to rear, and during the depositing of the doughpieces moves from the rear to the front, relatively to the belt tongue end.

3. Equipment in accordance with claim 1, characterized in that in a way that is of itself known there is provided, above the belt tongue that serves for taking over the bake pieces, an upper transferring belt.

4. Equipment in accordance with claim 1, characterized in that the depositing tongue of the transferring conveyor belt can be raised relatively to the following doughpieces carrier, in particular the baked goods carrier.

5. Equipment in accordance with claim 4, characterized in that the slide with the conveyor belt can be pivoted relatively to the frame.

6. Equipment in accordance with claims 5, characterized in that there are disposed on the frame guiderails upon which there can run, after the operation of a switch, guidepins attached to the slide.

7. Equipment in accordance with claim 1, characterized in that below the depositing tongue of the transferring conveyor belt are disposed a chute, which can preferably be folded down, as well as a conveyor belt or an equivalent conveying means, which moves transversely of the transferring conveyor belt direction.

8. Equipment in accordance with claim 1, characterized in that for the purpose of bringing up the doughpieces carrier that is to be unloaded there is provided a preferably motor driven rollers track, a conveyor belt or the like, which runs transversely of the transferring conveyor belt.

9. Equipment in accordance with claim 8, characterized in that there is disposed in the path of the rollers track a stop which limits the advance of the doughpieces carrier and is controllable.

10. Equipment in accordance with claim 9, characterized in that the chute can be swung into the plane of the guidesheets or rails.

11. Equipment in accordance with 1, characterized in that for the purpose of transferring the carriers charged with doughpieces, preferably baking sheets, there can be fastened in front of the front end of the transferring conveyor belt a rigid stop-rail which extends transversely of the said belt, and characterized in that the slide with the conveyor belt can be pulled back to beyond the transfer place, and in that between the receiving and delivering places are disposed guidesheets or guiderails.

12. Equipment in accordance with claim 1, characterized in that the slide and the transferring conveyor belt are each equipped with their own controllable and reversible drivers, preferably electromotors.

13. Equipment in accordance with claim 12, characterized in that the drive motor of the transferring conveyor belt is disposed on the slide, and through the intermediary of a drive connection, preferably a chain drive, it drives a roller wrapped round by the conveyor belt.

14. Equipment in accordance with claim 12 characterized in that the drive motor for the slide is disposed in the frame, and is connected with the slide, guided in rails, through the intermediary of a chain drive or the like.

15. Equipment in accordance with claim 12, characterized in that the motor serving to drive the slide drivers, through the intermediary of a slip-free drive-connection, preferably a chain drive, a cam-disk, whose switching-lobes operate switches, or similar switching means, disposed in the electrical circuit of the drive motors.

16. Equipment in accordance with claim 1, characterized by a controlling contrivance, which acts on the drive means for the slide and of the conveyor belt respectively, and which can be automatically triggered by a following doughpieces carrier, particularly the baked goods carrier.

17. Equipment in accordance with claim 16 for loading and unloading intermittently moved baked goods carriers, in particular the swings of swing-ovens, characterized by a cam-disk, driven by a baked goods carrier, chose cam-lobe acts on a switch serving to produce the control pulse.

18. Equipment in accordance with claim 16 for loading and unloading continuously moved baked goods carriers, for example network bands of run-through ovens or the like, characterized by a light-barrier which senses the baking area, and by an electronic metering and controlling apparatus for producing the control pulse.

19. Equipment in accordance with claim 1, characterized in that the frame is provided with rollers which can be arrested and on which it can move.